(12) United States Patent
Raleigh et al.

(10) Patent No.: US 12,081,968 B2
(45) Date of Patent: Sep. 3, 2024

(54) AUTOMATED CREDENTIAL PORTING FOR MOBILE DEVICES

(71) Applicant: Headwater Research LLC, Tyler, TX (US)

(72) Inventors: Gregory G. Raleigh, Incline Village, NV (US); James Lavine, Denver, NC (US)

(73) Assignee: Headwater Research LLC, Tyler, TX (US)

( * ) Notice: Subject to any disclaimer, the term of this patent is extended or adjusted under 35 U.S.C. 154(b) by 0 days.

(21) Appl. No.: 18/215,738

(22) Filed: Jun. 28, 2023

(65) Prior Publication Data

US 2023/0345238 A1    Oct. 26, 2023

Related U.S. Application Data

(60) Continuation of application No. 17/093,507, filed on Nov. 9, 2020, now Pat. No. 11,743,717, which is a
(Continued)

(51) Int. Cl.
*H04W 12/04* (2021.01)
*H04L 9/40* (2022.01)
(Continued)

(52) U.S. Cl.
CPC ........... *H04W 12/04* (2013.01); *H04L 63/062* (2013.01); *H04L 63/08* (2013.01); *H04W 12/06* (2013.01); *H04W 12/35* (2021.01)

(58) Field of Classification Search
CPC ... H04L 47/803; H04L 67/28; H04L 41/0806; H04L 45/306; H04L 69/24; H04L 41/0893; H04L 67/34; H04L 67/22; H04L 63/105; H04L 67/30; H04L 67/04; H04L 41/5054; H04L 67/20; H04L 47/824; H04W 4/24; H04W 4/50; H04W 72/0433; H04W 8/24;
(Continued)

(56) References Cited

U.S. PATENT DOCUMENTS 8,301,141 B1 * 10/2012 Reeves .................... H04W 4/16
  455/418
8,676,273 B1 *  3/2014 Fujisaki ................ H04M 1/724
  455/418
(Continued)

*Primary Examiner* — Andrew Joseph Rudy
(74) *Attorney, Agent, or Firm* — Farjami & Farjami LLP

(57) ABSTRACT

Devices, systems, and non-transitory computer-readable storage media for updating wireless device credentials, the wireless device comprising: a user interface, memory configured to store one or more credentials for enabling the wireless device to obtain one or more services over a wireless access network, and one or more processors configured to execute one or more machine-executable instructions that, when executed by the one or more processors, cause the one or more processors to obtain an indication of a user request to replace a particular credential with a target credential, detect a network-provisioning state change, determine that the particular credential does not match the target credential, initiate a programming session with a network element over a wireless access network, obtain an updated credential from the network element, and assist in storing the updated credential in memory.

20 Claims, 16 Drawing Sheets

Related U.S. Application Data continuation of application No. 16/235,661, filed on Dec. 28, 2018, now Pat. No. 10,834,583, which is a continuation of application No. 15/467,101, filed on Mar. 23, 2017, now Pat. No. 10,171,995, which is a division of application No. 14/208,236, filed on Mar. 13, 2014, now Pat. No. 9,609,510.

(60) Provisional application No. 61/785,988, filed on Mar. 14, 2013.

(51) Int. Cl.
*H04W 12/06* (2021.01)
*H04W 12/30* (2021.01)

(58) Field of Classification Search
CPC ..... H04W 8/04; H04W 8/18; H04W 72/0493; H04W 48/14; G06Q 50/10; G06Q 30/0601; G06Q 40/025; G06Q 40/02; G06Q 40/20
USPC ........ 709/216–225; 455/414.1, 456; 701/538
See application file for complete search history.

(56) References Cited

U.S. PATENT DOCUMENTS

| | | | | |
|---|---|---|---|---|
| 8,793,758 | B2* | 7/2014 | Raleigh | H04L 41/046 455/414.1 |
| 8,924,469 | B2* | 12/2014 | Raleigh | G06Q 30/04 455/406 |
| 9,883,399 | B2* | 1/2018 | Salkintzis | H04L 63/00 |
| 10,064,055 | B2* | 8/2018 | Raleigh | H04L 63/0876 |
| 10,225,733 | B2* | 3/2019 | Huber | H04W 48/08 |
| 11,743,717 | B2* | 8/2023 | Raleigh | H04L 63/08 455/414.1 |
| 2010/0192212 | A1* | 7/2010 | Raleigh | H04M 15/49 726/7 |

* cited by examiner

FIG. 4

Phone Number

What you need

Make sure you have:
* A copy of your last phone bill (recommended)
* Phone number to transfer
* First Name
* Last Name
* Street Number
* Street Name
* City, State & Zip
* SSN or Account Number/Name

Transfer your number

The information below is required by your old carrier to transfer number to ItsOn Mobile.

First Name (required)

[First Name]

Last Name (required)

[Last Name]

or

Business Name

[Business Name]

The mobile number you want to transfer (required)

[Phone Number (contact)]

Last 4 digits of Social Security Number or Tax ID (required if account number/name unavailable)

[Cancel]

Transfer your number — 1174

Billing Address

Street Number (required)
[Street Number]

Street Name (required)
[Street Name]

City (required)
[City]

State (required)
[State]

Zip Code (required)
[Zip]

Your current carrier account information

Account Number/name (without dashes)
(required if no SSN/Tax ID #)
[Account #/name (no dashes)]

Cancel    Continue

FIG. 7B

ItsOn Initial Phone Setup

Final Transfer Review

It is important the information for the transfer of your mobile number be correct.

Please review it carefully for accuracy. Errors will impact the transfer and may affect the functionality of your phone.

Cancel

OK

Edit

Transfer

AUTOMATED CREDENTIAL PORTING FOR MOBILE DEVICES

BACKGROUND

With the advent of mass-market wireless mobile devices and subscription wireless services, there are an increasing number of instances in which a mobile device user who has subscribed to a service provided by a service provider will stop using one device in favor of a new or otherwise different device, or stop his or her subscription with one service provider in favor of subscribing with another service provider. It is often the case that when a subscriber obtains a new device or moves from one service provider to another, the subscriber wishes to remain associated with the same phone number he or she has been using.

BRIEF DESCRIPTION OF THE DRAWINGS

Objects, features, and advantages of the present disclosure will be more clearly understood from the following detailed description taken in conjunction with the accompanying drawings, in which:

FIG. 4 illustrates an exemplary screen including a mechanism to request a new phone number or initiate a phone number transfer request from the device.

FIG. 6 illustrates an exemplary screen displaying a notification listing the information to complete a phone number transfer.

FIGS. 7A and 7B illustrate an exemplary screens for entering account information to complete a phone number transfer.

FIG. 8 illustrates an exemplary screen requesting confirmation from the user to initiate the phone number transfer request.

DETAILED DESCRIPTION

Figure 1:
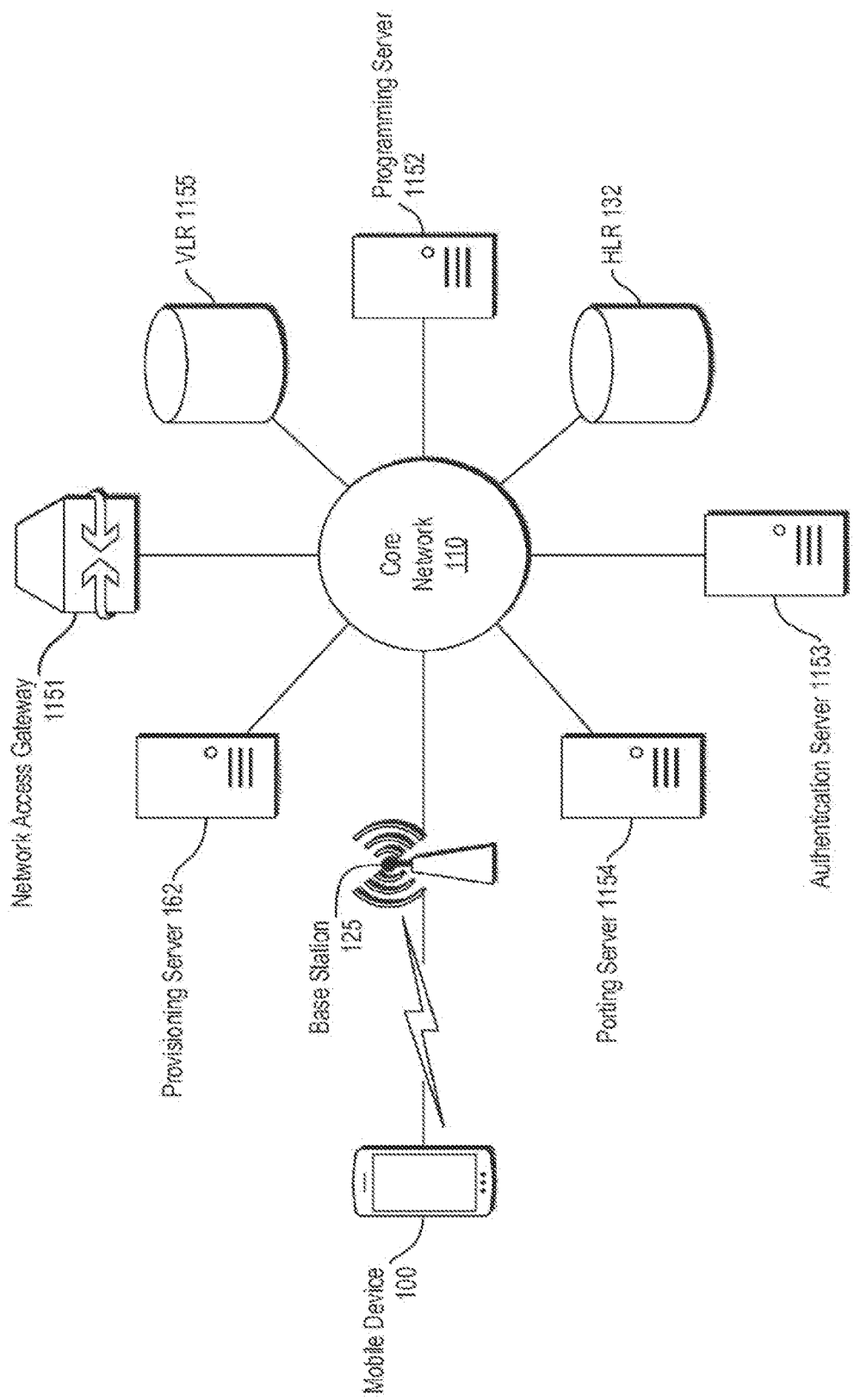
FIG. 1 illustrates components of a wireless network architecture in accordance with some embodiments.

This document discloses a mobile device wireless service management system to provide automated phone number porting (also referred to herein as "phone number transferring" or "number transfer").

A wireless device (also referred to herein as a "mobile device" or simply as a "device") communicates over a wireless access network (also referred to as the "network") with a network system comprising one or more network elements to access resources, such as data services, voice services, messaging services, transactional services, etc.

In a wireless network system, mobile devices authenticate with the network system based on credentials that are stored on the device and verified by the network system. Examples of credentials include, but are not limited to, a phone number, an international mobile subscriber identifier (IMSI), a mobile station identifier (MSID), a mobile station international ISDN number (MSISDN), a subscriber information module (SIM) identifier, an electronic serial number (ESN), a mobile equipment identifier (MEID), an international mobile equipment identity (IMEI), a device identifier, a subscriber identifier, a service account identifier, a media access control (MAC) address, an Internet protocol (IP) address, a token, a one-time token, a mobile directory number (MDN), a network access identifier (NAI), a user name, a password, access point name (APN) configuration information (e.g., APN name, APN username, APN password, APN gateway, APN SMSC/MMSC, APN type, etc.), an encryption key (Ki), a Wi-Fi service set identifier (SSID), a Wi-Fi network configuration (e.g., access point (AP) name, AP IP address, AP username, AP password, AP encryption type. AP security key, etc.), an IP address, any other identifying information that uniquely identifies a wireless device, and combinations of these. Some credentials (e.g., an ESN, a device identifier, etc.) are permanently associated with a device. But other credentials (e.g., a SIM, a phone number, etc.) may be moved from one device to another device. These movable credentials are referred to herein as "portable credentials."

To gain access to a wireless access network, a subscriber needs some sort of account with the service provider (also referred to as an "operator," "network operator." "wireless operator," or similar term). Although some consumers choose pre-loaded, pre-paid, "disposable" devices, many consumers have ongoing accounts (either pre-pay or post-pay) with service providers. A subscriber's account with a service provider is typically associated with a portable credential. For example, a subscriber account may be associated with a SIM card that stores information needed for a device containing the SIM to access a particular service provider's network.

When a device is capable of making phone calls, the device and the subscriber's account are associated with a telephone number (or "phone number"), which can be ported from one device to another or from one service provider to another. It is often the case that when a subscriber obtains a new device or moves his or her service subscription from one service provider to another, the subscriber wishes to remain associated with the same phone number he or she has been using.

There are several circumstances in which a phone number that is currently associated with a particular device and a current service provider needs to be ported. First, a subscriber could decide to upgrade or change the particular device to a new device, but stay with the current service provider and keep the current phone number. Second, a subscriber could decide to change from the current service provider to a new service provider, but keep the particular device and the current phone number. Third, a subscriber could decide to change from the current service provider to the new service provider, and also upgrade or change the particular device to the new device, but keep the current phone number. Fourth, a subscriber could have a first device associated with a first phone number and a first service provider, and a second device associated with a second phone number and a second service provider, and the subscriber wishes to port the first phone number to the second device.

When the subscriber decides to upgrade or change the particular device to a new device, but chooses to stay with the current service provider and keep the current phone number, the porting of the phone number is typically simple because the subscriber already has an account with the current service provider, and the subscriber's phone number is already recognized by the current service provider. For GSM devices, porting the subscriber's phone number from the current device to the new device is accomplished by moving the SIM from the current device to the new device, which can often be done by the subscriber without support from or, in some cases, knowledge of the current service provider.

When the subscriber changes from the current service provider to a new service provider, however (e.g., the second, third, and fourth cases described above), the process of porting a number from one service provider to another takes some amount of time and can, in extreme cases, take days. At some point during the number porting process, the device and the network system of the current service provider can no longer communicate, and the device and the network system of the new service provider cannot communicate until the credentials stored on the device are updated to match the credentials stored in the new service provider's network system. Sometimes the new service provider sets up the subscriber's mobile device with temporary credentials so the mobile device can operate on the new wireless provider's network while the number porting process is ongoing. The temporary credentials allow the subscriber to begin using service with the new service provider immediately, even though the number porting is not complete. But because the credentials that allow the subscriber to use service with the new service provider while the number porting process is ongoing are temporary credentials, when the porting process is complete, the subscriber's mobile device needs to be updated with the desired credentials, including the subscriber's phone number.

Today, when it is necessary to update a wireless device using temporary credentials so that the device thereafter uses the intended credentials, the user of the wireless device may need to intervene to update the credentials so the device can communicate with the new service provider's network system with its desired credentials. This intervention is sometimes a sequence of steps that forces the device into a state where it can contact a programming server to get its credentials updated. Other times, the sequence entails the user manually programming the credentials into the device.

Disclosed herein are systems, devices, and methods that provide for the updating of device credentials after a phone number port without user intervention. In some embodiments, the mobile device detects a network provisioning state change (e.g., detects that the device credentials are to be updated) and automatically initiates a programming session with a programming server to enable the device to obtain the desired credentials without the intervention of the user. Automation of this process ensures that the updating of credentials occurs when necessary and without user intervention. One of the benefits of this process is that it can reduce calls to a customer care center because this process helps to ensure that the device does not enter into a state in which it cannot interact with the network system and, as a result, appear to be unusable to the end user.

In some embodiments, the device comprises one or more device agents that determine when the desired phone number, previously associated with a different service provider, is available for porting onto the device so that a user of the device does not need to take any action to determine when the number is available for porting or to begin the porting process. In these and other embodiments, the one or more device agents may be configured to automatically determine that the desired phone number is available for porting and initiate the device side of the number porting process. In some embodiments, the one or more device agents are embodied in a service processor on the device.

In some embodiments, the device user can initiate number porting during initial account set up or creation, or during initial device setup, directly on the device. In some embodiments, the user can enter, through a user interface of the device, a request to cause a different device's phone number to be ported onto the device.

FIG. 1 illustrates components of a typical wireless network system. Mobile device 100 communicates with core network 110 through base station 125. To gain access to voice, messaging, and data services, mobile device 100 authenticates with various network elements, including home location register (HLR) 132, authentication server 1153, and network access gateway 1151. Failure to authenticate with these elements normally results in denied service access via the wireless network.

In some embodiments, a subscriber is able to initiate a number port (or "number transfer") directly from mobile device 100. In some embodiments, the subscriber accesses a device application and enters, into a device application user interface (UI), the information needed to initiate the port. In some embodiments, the number porting is assisted by one or more device agents that run on the mobile device that the phone number is desired to be ported to. The one or more device agents can comprise an application program, an operating system (OS) component, an OS function, an OS service, a modem programming agent, a modem software or firmware agent, an over-the-air (OTA) mobile device parameter programing agent, an Open Mobile Alliance (OMA) agent, a secure communication agent configured to communicate number porting and number provisioning information, another software or firmware agent, or a combination of these.

In some embodiments, the one or more device agents communicate with one or more network elements (e.g., porting server 1154) that are configured to exchange number porting information and number provisioning information with the one or more device agents. In some embodiments, the one or more device agents establish a secure communication link with the one or more network elements to allow the secure exchange of number porting information and number provisioning information. In some embodiments, the formatting and/or protocols for the communications between the one or more device agents and the one or more network elements are established according to an application programming interface (API) between the one or more device agents responsible for (e.g., initiating) number porting and the one or more network elements that assist in the porting.

In some embodiments, after the one or more device agents collect the information from the subscriber, the one or more device agents communicate the information to porting server 1154. In some embodiments, the communication is over a cellular network. In some embodiments, the communication is over the short messaging service (SMS) channel. In some embodiments, the communication is over a Wi-Fi network. Porting server 1154 is responsible for initiating and managing the porting process between the wireless operator and the porting agency (or the subscriber's previous service provider, or an intermediary brokering system). In some embodiments, mobile device 100 stores a local copy of the subscriber's phone number that was entered on the device application when the port was initiated.

In some embodiments, a subscriber wishes to port a phone number associated with a second device or a second service account (the "second phone number") to a first device. In some such embodiments, the number porting is assisted by one or more network elements (e.g., porting server 1154) that are configured to communicate with the one or more device agents on the first device to exchange account information. The one or more network elements then submit the request or instruction to port the second phone number to the first device to a subscriber management system responsible for managing the association of the second phone number with the second device or the second service account. The one or more network elements then obtain an indication that the second phone number has been released, and the one or more network elements communicate with the one or more device agents to cause the second phone number to be ported to the first device. In some embodiments, a subscriber management system responsible for managing the association of the second phone number with the first device participates in the number porting process by provisioning an aspect of the network policy associated with the first device to recognize or authenticate the second phone number for the first device.

In some embodiments, a first subscriber management system that manages a first device communicates with a second subscriber management system that manages a second device to request the phone number port and provides user information to authenticate the port of a phone number from either the first device to the second device or vice versa. In some embodiments the first device and/or number and second device and/or number are both managed by the same subscriber management system; in this case, the subscriber management system goes to itself to request the number port and provides user information to authenticate the port.

Once the porting process is complete, porting server 1154 updates wireless operator provisioning server 162, which then provisions certain network elements, including programming server 1152, with the new credentials (e.g., telephone number, network access identifier (NAI), user name, password, IP address, etc.), including the telephone number. In some embodiments, the updating of the provisioning information to the network elements will cause mobile device 100 to stop functioning on the network because its credentials are no longer associated with an active subscriber account.

In some embodiments, when the provisioning of the network system with the new device credentials is complete, mobile device 100 detects that it can no longer access the network. Detection of denied access to the network can include failed registration attempts, failed authentication attempts (e.g., invalid user name, invalid password, invalid telephone number, invalid device identifier, etc.), or failed authorization for services. When mobile device 100 detects that it can no longer access the network, it checks its internal state. In some embodiments, detecting the internal state comprises comparing one or more current device credentials with an expected credential (e.g., comparing a current phone number with an expected new phone number). When mobile device 100 detects that a current device credential does not match the expected credential, and mobile device 100 expects the credential to change, mobile device 100 enters into a programming session with programming server 1152. In some embodiments, putting mobile device 100 into a programming session entails providing a set of bootstrap credentials to mobile device 100, where the bootstrap credentials provide the mobile device with limited access to the network (e.g., mobile device 100 can only access the programming server 1152 either directly or indirectly via network access gateway 1151). In some embodiments, mobile device 100 is configured to communicate with programming server 1152 via a Wi-Fi or another type of alternative network. In some embodiments, the subscriber associated with mobile device 100 is not charged for usage of the wireless access network or alternative network associated with the device's communications with programming server 1152 (i.e., usage is not accounted to a user account, or usage is zero-rated by the service provider or another party).

Once mobile device 100 has access to programming server 1152, mobile device 100 initiates a programming communication session with programming server 1152. In some embodiments, device interaction with programming server 1152 is over the data channel, the SMS channel, the voice channel, the unstructured supplementary service data (USSD) channel, or over Wi-Fi or another network that provides mobile device 100 with access to programming server 1152. In some embodiments, when mobile device 100 is accessing programming server 1152, access to other network elements or network end-points is restricted or prohibited. Programming server 1152 delivers the new device credentials to the mobile device 100. Mobile device 100 receives the updated credentials and stores the new credentials locally on the device. Upon completion of the programming session, mobile device 100 begins to use the new credentials to access the wireless network. In some embodiments, mobile device 100 compares the new credentials to the expected credentials to determine if the current credentials are, in fact, the expected credentials or additional interim credentials. In some embodiments, if the current credentials match the expected credentials, the update process is determined to be complete.

In some embodiments, an over the air device provisioning network element (e.g., programming server 1152) participates in the number porting process by causing an aspect of a first device's credentials to be re-programmed to provision a new phone number onto the first device. In some embodiments, the aspect of the first device's credentials that is re-programmed to provision the new phone number onto the first device comprises the phone number or mobile directory number (MDN), NAI, password, access point name (APN) configuration information (e.g., APN name, APN username, APN password, APN gateway. APN SMSC/MMSC, APN type, etc.), username, IP address, MAC address, international mobile subscriber identity (IMSI), encryption key (Ki), Wi-Fi service set identifier (SSID), Wi-Fi network configuration (e.g., access point (AP) name, AP IP address, AP username, AP password, AP encryption type, AP security key, etc.), or a combination of these.

It is to be appreciated that the functions described above are illustrated in FIG. 1 in a particular way, but that the functions may be disposed differently than shown in FIG. 1. In particular, the functions may be performed by more or fewer network elements than shown in FIG. 1.

Figure 2:
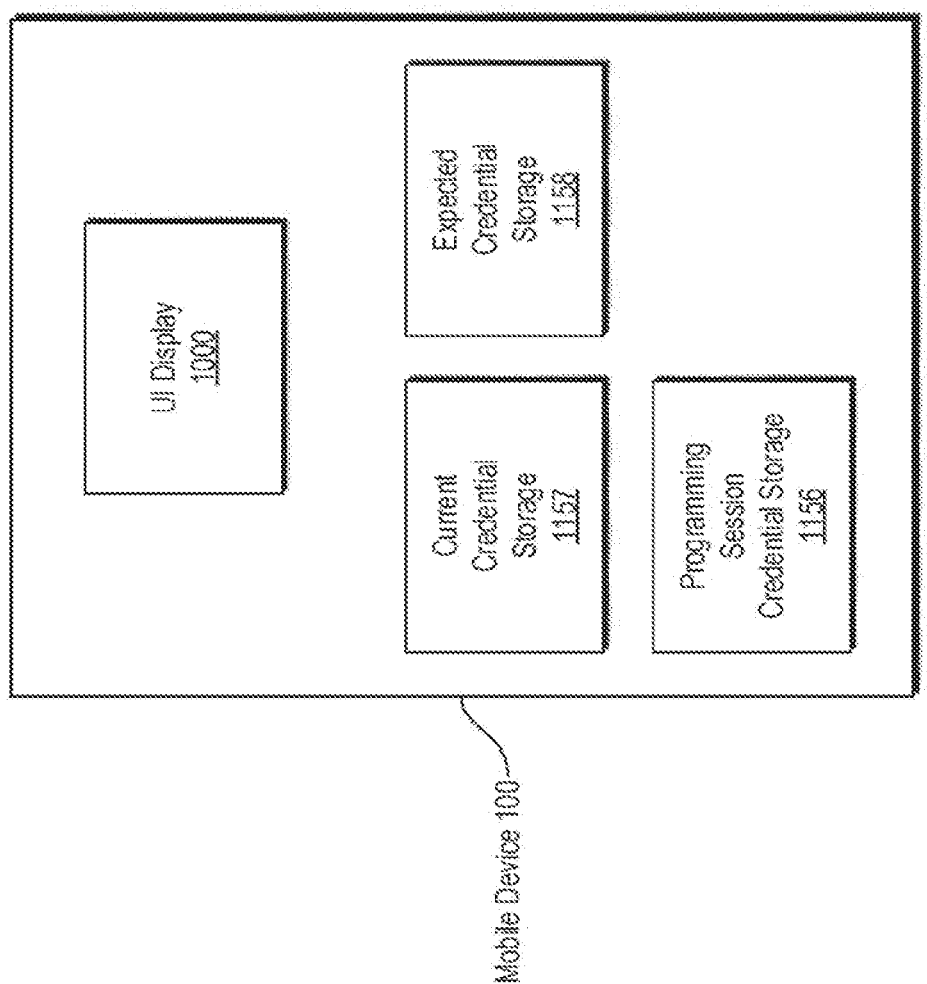
FIG. 2 illustrates components of a mobile device in accordance with some embodiments.

FIG. 2 illustrates various components of mobile device 100, including UI display 1000, through which the subscriber can interact with the device application via the display and UI element (e.g., on-screen keyboard, speech recognition processor, physical keyboard, etc.). Current credential storage 1157 is device memory where mobile device 100 stores its current credentials to access the wireless network. In some embodiments, current credential storage 1157 is protected or encrypted to prohibit the user from directly (or indirectly) modifying the information stored in current credential storage 1157. In some embodiments, current credential storage 1157 is accessible only to the wireless modem that allows the device to access the wireless access network.

Programming session credential storage 1156 is device memory where mobile device 100 stores the credentials and configuration to access programming server 1152. In some embodiments, the programming session credentials include network type (e.g., cellular, Wi-Fi, Bluetooth, etc.), network name (e.g., APN name. Wi-Fi SSID, etc.) or other information that enables mobile device 100 to access programming server 1152. In some embodiments, programming session credential storage 1156 is protected or encrypted to prohibit the user from directly (or indirectly) modifying the information stored in programming session credential storage 1156. In some embodiments, programming session credential storage 1156 is accessible only to the wireless modem that allows the device to access the wireless access network.

Expected credential storage 1158 is device memory where mobile device 100 stores the expected credentials to be programmed to mobile device 100. In some embodiments, mobile device 100 uses the expected credentials to detect when mobile device 100 has received its final set of credentials related to the transaction that caused the credentials to change (e.g., a request to port a new phone number to mobile device 100). For example, the expected credentials could be the porting phone number, a new network access identifier, a new IP address, etc.

It is to be appreciated that although FIG. 2 illustrates current credential storage 1157, expected credential storage 1158, and programming session credential storage 1156 separately, they may all be located in the same memory (which may be secure memory).

Figure 3:
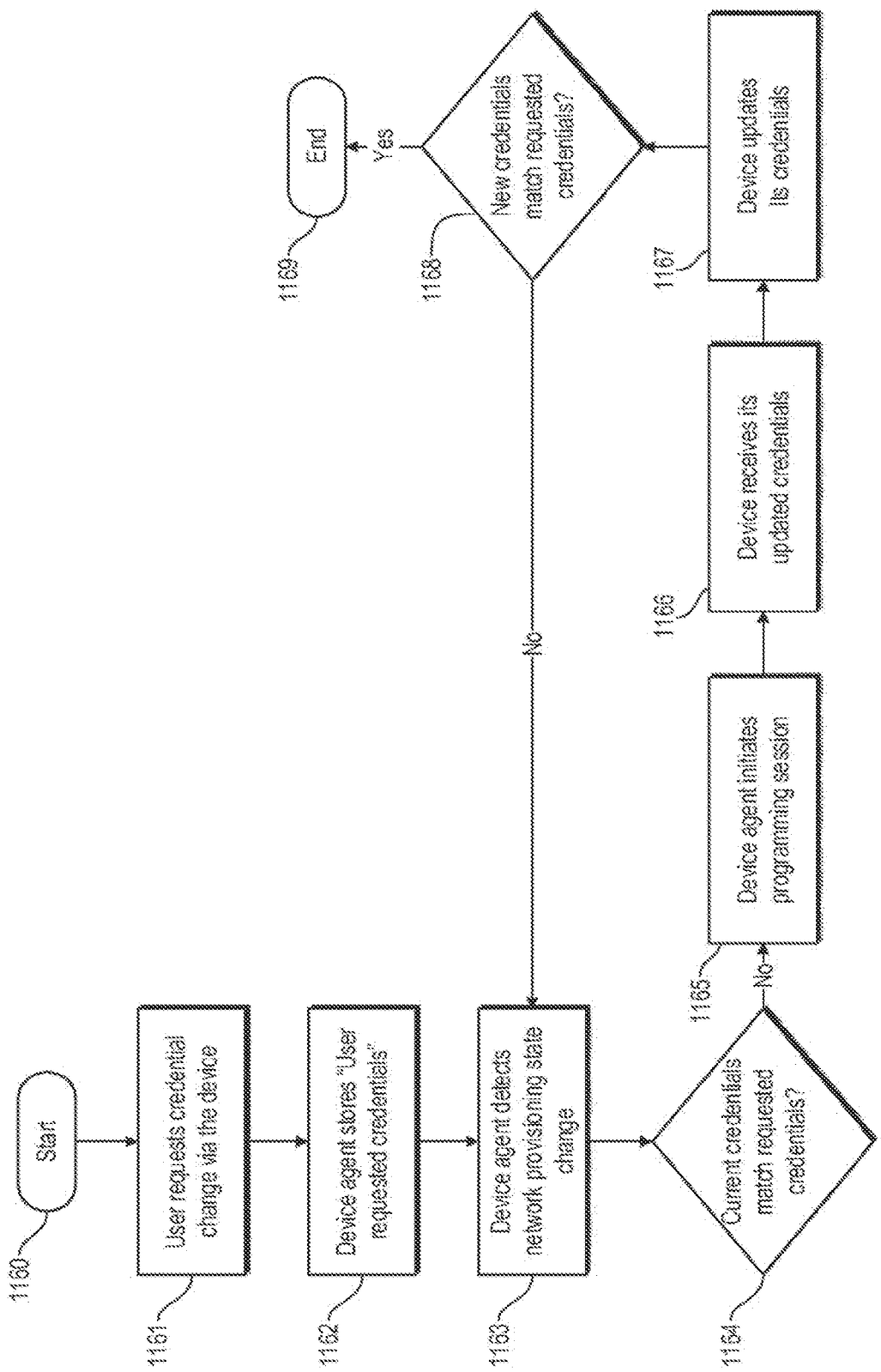
FIG. 3 illustrates a flow diagram for updating one or more credentials of a mobile device in accordance with some embodiments.

FIG. 3 is a flowchart showing a procedure to update one or more credentials of a mobile device in accordance with some embodiments. At 1160, the procedure starts. At 1161, the device user requests to have at least some aspect of the one or more device credentials changed via a UI interaction on the device. Examples of UI interaction include interaction with a browser application, an OS application, an OS settings application, a native application, etc. The UI interaction causes the device to communicate with an application server (e.g., porting server 1154, programming server 1152) to facilitate and complete the credential change request.

At 1162, the device stores (e.g., using one or more device agents) the requested credential information locally on the device. In some embodiments, the device receives this information from the application server or other network element. In some embodiments, the device receives this information from the UI interaction application on the device or from the one or more device agents. In some embodiments, the requested credential information includes information about all of the one or more credentials that were requested to be changed. In some embodiments, the requested credential information contains a subset of information about all of the one or more credentials that were requested to be changed. In some embodiments in which, at the time the number port is requested, the device is associated with a first phone number and/or other first credential(s), the number being ported and/or other re-provisioning information is not fully programmed onto the device before the first number and/or other first credential(s) become partially invalid or invalid.

At 1163, the device detects the network provisioning state change. There are a number of ways in which the device can detect the network provisioning state change, including denied registration attempts, denied voice call attempts, denied text message transmission attempts, failed authentication with a network element, failed authorization for services, or any other mechanism that signals the device that network provisioning has changed.

At 1164, the device determines whether a current credential matches the requested credential to determine if there is a mismatch between the credential that is currently programmed on the device and the credential that the device is expecting to be programmed on the device. In some embodiments, the requested credential may be a configuration state indicator, and the device inspects the configuration state indicator to determine if the device expected additional credential updates associated with the credential change request.

At 1165, the device has determined that it is expecting a credential update, and as a result the device initiates a programming session (e.g., the one or more device agents initiate a programming session). In some embodiments, initiating a programming session entails setting the device to a well-known configuration state (e.g., a bootstrap state, etc.) to enable the device to contact a network element (e.g., programming server 1152). In some embodiments, initiating a programming session entails switching the device to an alternative network (e.g., Wi-Fi, etc.) or communication channel (e.g., SMS, etc.) prior to initiating communications with the network element (e.g., programming server 1152). In some embodiments, the communication with the network element (e.g., programming server 1152) utilizes an ambient service so that usage of the wireless access network associated with the device's communication with the network element is subsidized or paid-for by an entity other than the party responsible for paying for access to the wireless access network by the device (e.g., the party responsible for paying for access to the wireless access network by the device is the user, subscriber, account-holder, enterprise, parent, etc.). In some embodiments, when the communication with the network element (e.g., programming server 1152) occurs using an ambient service, the party responsible for paying for access to the wireless access network by the device (e.g., the user, subscriber, account-holder, enterprise, parent, etc.) is not charged for the network communications associated with the device programming.

At 1166, the device communicates with the network element (e.g., programming server 1152) to obtain its updated credential(s). In some embodiments, the device performs an authentication process with the network element (e.g., programming server 1152). In some embodiments, the configuration data is encrypted or delivered over an encrypted and secure channel. In some embodiments, the configuration data is encrypted using device-specific information (e.g., an IMSI, Ki, A-key, MAC address, etc.), either directly or indirectly.

At 1167, after the device receives its updated credentials, it updates its local memory with the new credentials. In some embodiments, the updated credentials also include updated device configuration information (e.g., access server information, new data network configuration, device UI configuration, branding information, etc.). For example, the updated device configuration information can include a logo, color scheme, icon, or any other branding information that indicates the device is now associated with a different service provider.

At 1168, the device compares the updated credentials with the expected credentials to determine if the credential update process associated with the initial transaction (at 1161) is complete. In some embodiments, there may be additional interim credentials assigned to the device while the transaction is in progress. In some embodiments, the transaction requires multiple credential updates. In some embodiments, the device checks a credential update state variable to determine if the credential update process is complete. If the credential update process is complete, the process ends at 1169. If the device expects further credential updates associated with the transaction initiated at 1161, the device continues to monitor for network provisioning state change (at 1163) and continues the cycle until the credential update process completes.

In some embodiments, the device performs the updating process automatically without informing the subscriber. In some embodiments, the credential update occurs in the background and is undetected by the user. In some embodiments, the programming process requires the device to be restarted one or more times. In some embodiments, when a reboot is required, it is desirable to present a visual or audible notification to the user to inform the user that the device is updating and/or rebooting. In some embodiments, the notification enables the user to postpone the update and/or device reboot.

Figure 4:
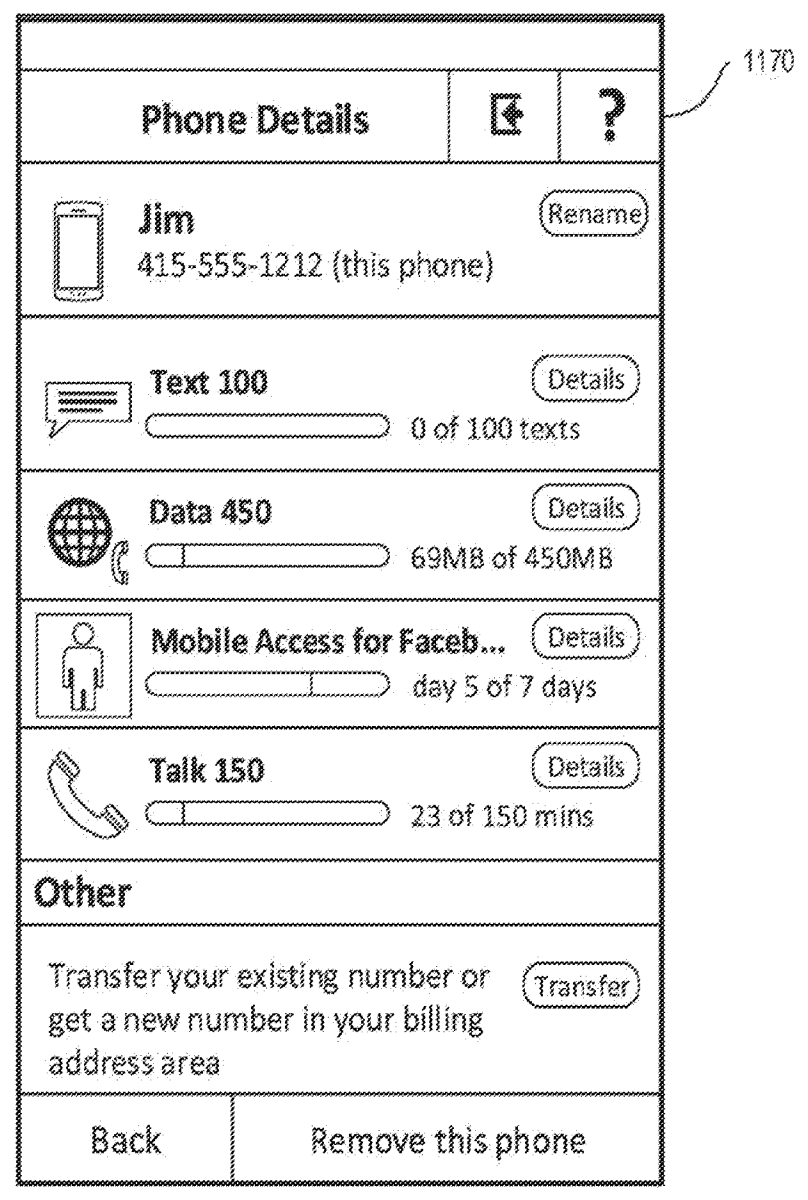

In some embodiments, the one or more device agents present a number porting option through a first device's UI to enable a user to port a phone number that is currently assigned to a second device (the "second phone number") onto the first device. In some embodiments, such as the exemplary embodiment shown in FIG. 4, the one or more device agents present an account UI screen 1170 to the user and provide a mechanism to request a new phone number or initiate a phone number transfer (e.g., port of the second phone number to the first device) request from the device. The UI element could be a menu item, a status bar item, a list item, dialog box, or any other UI construct to enable the user to initiate a phone number transfer request. In the embodiment illustrated by FIG. 4, the UI construct is a touch-sensitive button the user can touch to initiate a number transfer. As illustrated by FIG. 4, the screen 1170 informs the user that the user can press the "Transfer" button either to transfer an existing number to the device, or to request a new number.

Figure 5:
FIG. 5 illustrates an exemplary number management screen displayed when a user selects the "Transfer" region of FIG. 4.

In some embodiments, such as the exemplary embodiment shown in FIG. 5, in response to the user initiating a transfer (e.g., selecting "Transfer" in the embodiment shown in FIG. 4), the one or more device agents present a number management screen 1171 to the user and provide a mechanism to either request a new number or initiate a number transfer (port) request from the device. The UI element could be a menu item, a status bar item, a list item, dialog box, or any other UI construct to enable the user to manage his or her phone number on the device. In some embodiments, the one or more device agents may restrict the parties who are authorized to transfer a number. In the embodiment shown in FIG. 5, for example, a number transfer can be initiated from any device with the "Admin" role, where the "Admin" role is held by a subscriber, a parent, an enterprise, a device group manager, or any other designated party who is authorized to modify the settings or characteristics of the device for which the number transfer is being requested.

In some embodiments, when the user initiates the transfer of the second phone number from a first service provider to a second service provider (e.g., the user selects "Transfer my number from another phone" on the screen 1171 shown in FIG. 5), the one or more device agents present a screen to inform the user about information the user will need to provide in order to complete the request. In the embodiment shown in FIG. 6, for example, the one or more agents assist in presenting a notification 1172 through the display to inform the user that he or she should have a copy of the user's last bill from the first service provider (so that the user can enter, for example, an account number or other information commonly found on a service provider bill), the phone number to transfer, the first and last name of the user, the user's address, and the user's social security number or account number (or account name) with the first service provider.

In some embodiments, when the user accepts the number porting option (e.g., the user selects the "Continue" option of FIG. 5 or the "OK" option of FIG. 6), the one or more device agents present a screen to gather the second phone number, user information, and/or account information associated with the service account currently associated with the second phone number. In some embodiments, such as the representative screens 1173 and 1174 illustrated in FIGS. 7A and 7B, once the user decides to initiate a phone number transfer request, the user enters the requested information through the device UI to allow the second phone number to be transferred to the device (e.g., from a first service provider currently providing service to the second phone number to the service provider associated with the device to which the second phone number is requested to be transferred). In some embodiments, the information entered by a user to transfer a phone number includes one or more of the following pieces of information: phone number to transfer, billing first name, billing last name, company name, billing address (e.g., street number, street name, city, state, ZIP code), user's social security number, a portion of the user's social security number (e.g., last 4 digits), current-service-provider account number, current-service-provider account password, current-service-provider account PIN, or any other information to identify the subscriber or the account with the current service provider. In some embodiments, to prevent the inadvertent or malicious transfer of the second phone number to the device, the information entered includes information that is or should only be known by a subscriber associated with the second phone number (e.g., some or all of the subscriber's social security number, account number, password. PIN, etc.)

In some embodiments, all of the information to be collected to initiate the transfer of the second phone number to the device is entered on a single UI screen. In some embodiments, such as the exemplary embodiment of FIGS. 7A and 7B, the information to be collected is entered on multiple UI screens 1173 and 1174. In some embodiments, the user is queried about the current service provider (e.g., identifying information about the service provider currently providing service associated with the second phone number). In some embodiments, a network element assists in determining the current service provider by querying an entity. In some embodiments, the entity is a local database, a porting management entity, a remote database, or another system that contains the information. In some embodiments in which the current service provider is known, the information to be collected by the one or more device agents on the mobile device is tailored to the requirements of the current service provider (e.g., service provider "A" only requires first name, last name, phone number to port, and billing zip code; service provider "B" only requires phone number to port and account password, etc.).

In some embodiments, after the user enters the information needed for the one or more device agents to initiate the number transfer, the one or more device agents assist in presenting a confirmation screen through the user interface of the device. FIG. 8 illustrates an example of such a confirmation screen 1175. As shown in FIG. 8, the confirmation screen 1175 informs the user that it is important that the information provided by the user to initiate the transfer of the second phone number be correct. The screen of FIG. 8 asks the user to review the information and confirm that the information entered is correct.

Figure 9:
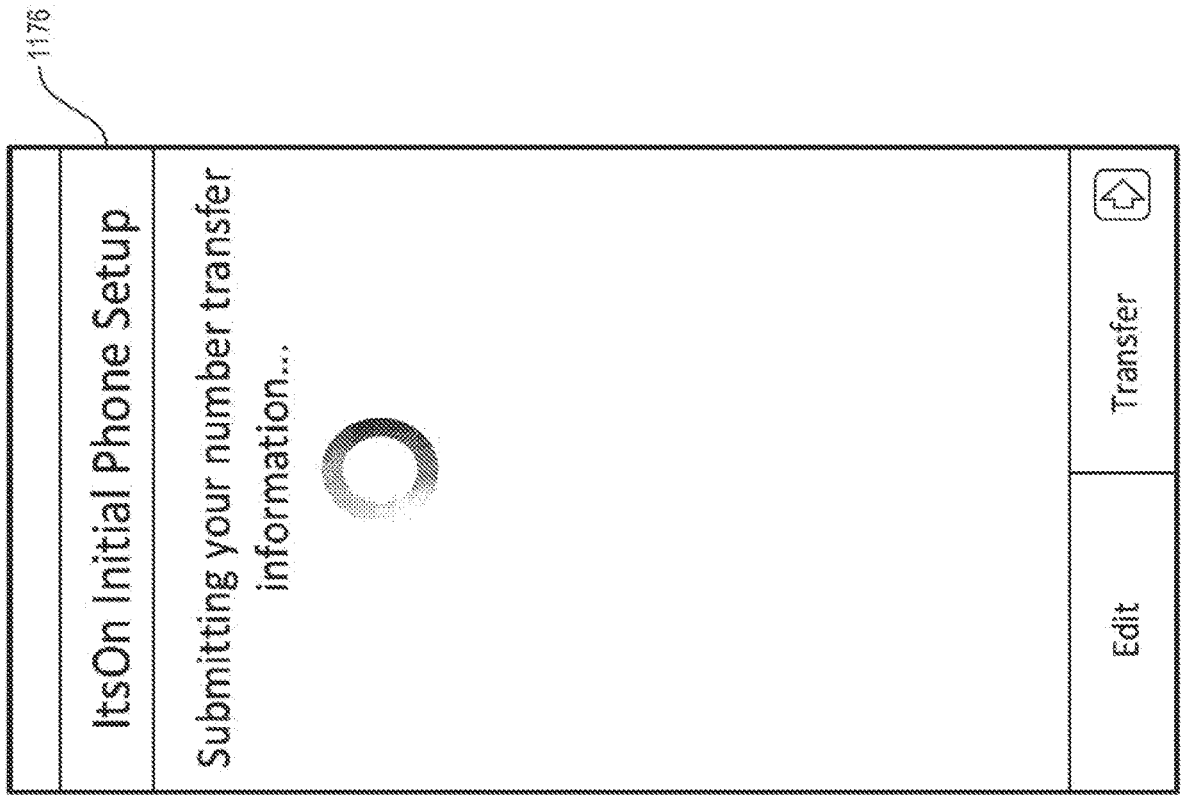
FIG. 9 illustrates an exemplary screen displaying a notification that the number transfer request has been initiated.

In some embodiments, after the user has provided the information needed for the one or more device agents to initiate the number transfer (e.g., the user has provided the information requested by the screens 1173 and 1174 illustrated in FIGS. 7A and 7B, or the user has selected "OK" from the screen 1175 illustrated in FIG. 8), the one or more device agents initiate the number transfer and provide a notification to the user that the number transfer process is beginning. FIG. 9 illustrates a specific embodiment of such a notification 1176. As shown in FIG. 9, the notification 1176 may include an icon or other indicia to indicate to the user that the number transfer information is being submitted.

Figure 10:
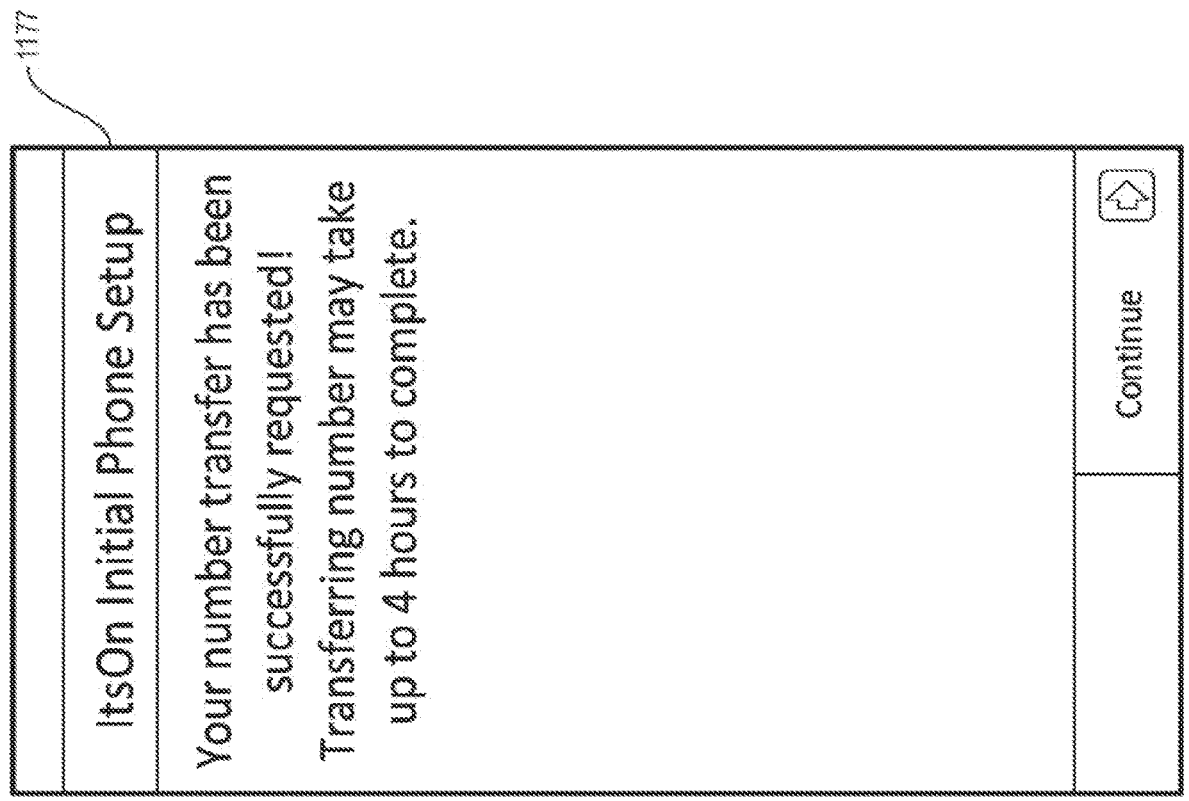
FIG. 10 illustrates an exemplary screen displaying a notification that the number transfer request has been successfully requested.

In some embodiments, after the one or more device agents have successfully initiated the number transfer, the one or more device agents assist in providing a notification to the user to inform the user that the number transfer has been requested. In some embodiments, the notification provides additional information, such as when the number transfer is expected to be completed. FIG. 10 illustrates a particular embodiment of such a notification 1177. The notification 1177 informs the user that the number transfer has been successfully requested, and that transferring the number may take up to four hours to complete.

Figure 11:
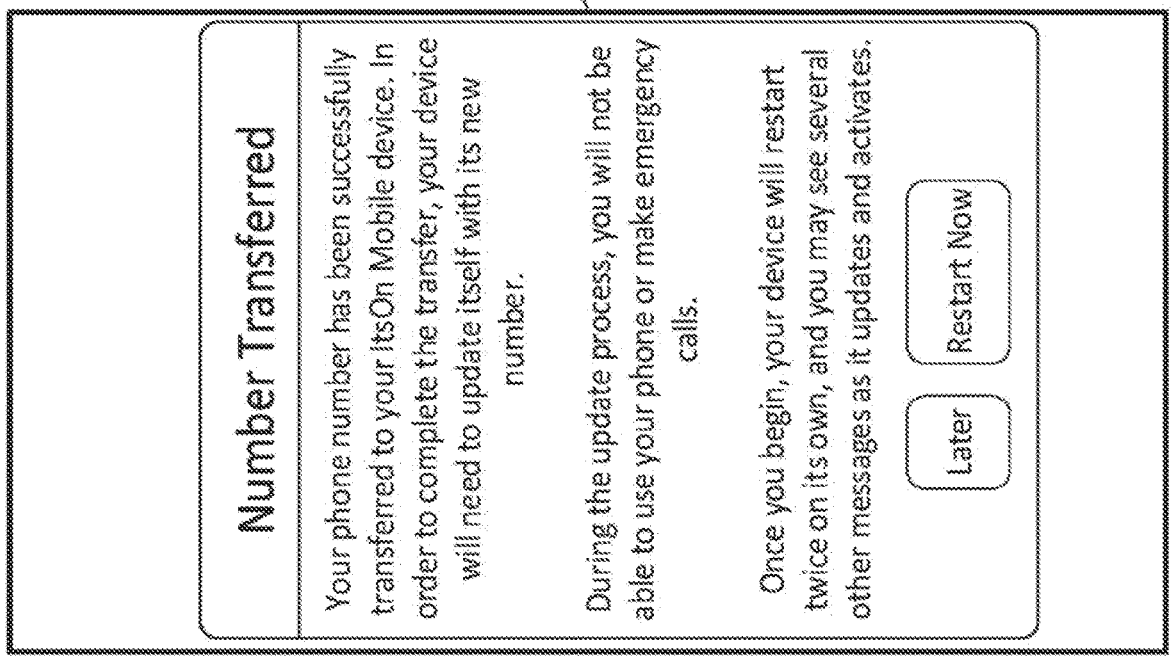
FIG. 11 illustrates an exemplary screen displaying a notification that the phone number has been successfully transferred to the device.

In some embodiments, as the porting process proceeds, the one or more device agents present notification messages (e.g., audible or visible notifications) through a first device UI to inform the user of the progress of the porting process. For example, the one or more device agents can present one or more messages through a display to inform the user that the port is proceeding, that the device has limited or no access to the wireless access network, that settings are being updated, that information is being loaded, that the device needs to be rebooted, etc. For example, the messages may inform the user that the user needs to reboot the device in order for the number port to complete. FIG. 11 illustrates a particular embodiment of such a notification 1178. In the embodiment of FIG. 11, the notification 1178 informs the user that the phone number has been successfully transferred to the device. In the embodiment of FIG. 11, the notification 1178 also informs the user that the device will need to update itself with its new number, and that during the update process, the user will not be able to use the device or make emergency calls. In addition, in the embodiment of FIG. 11, the notification 1178 informs the user that during the update process, the device will restart twice without user intervention, and the user may see additional messages as the device updates and activates. In the embodiment of FIG. 11, the notification 1178 presents the user with an option to defer the updating process until later.

Figure 12:
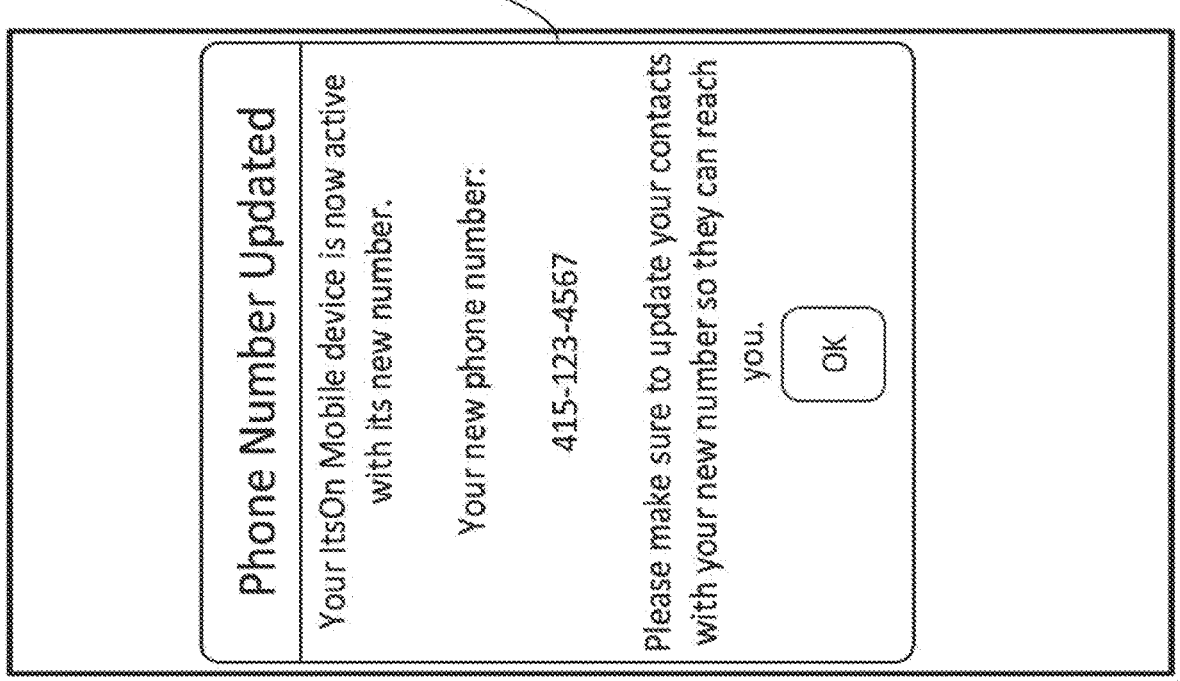
FIG. 12 illustrates an exemplary screen displaying a notification that the number transfer process has been successfully completed.

The one or more device agents can also present a notification upon completion of the number porting process to inform the user that the port was successful and/or that the device is now associated with the second phone number. FIG. 12 illustrates one such embodiment. In the embodiment of FIG. 12, the notification 1179 informs the user that the device is now active with its new number (the second phone number).

The one or more device agents can also present a notification if the number porting process fails, where such notification informs the user of the failure and, in some embodiments, provides additional information about the failure and/or directs the user to customer service for assistance.

Figure 13:
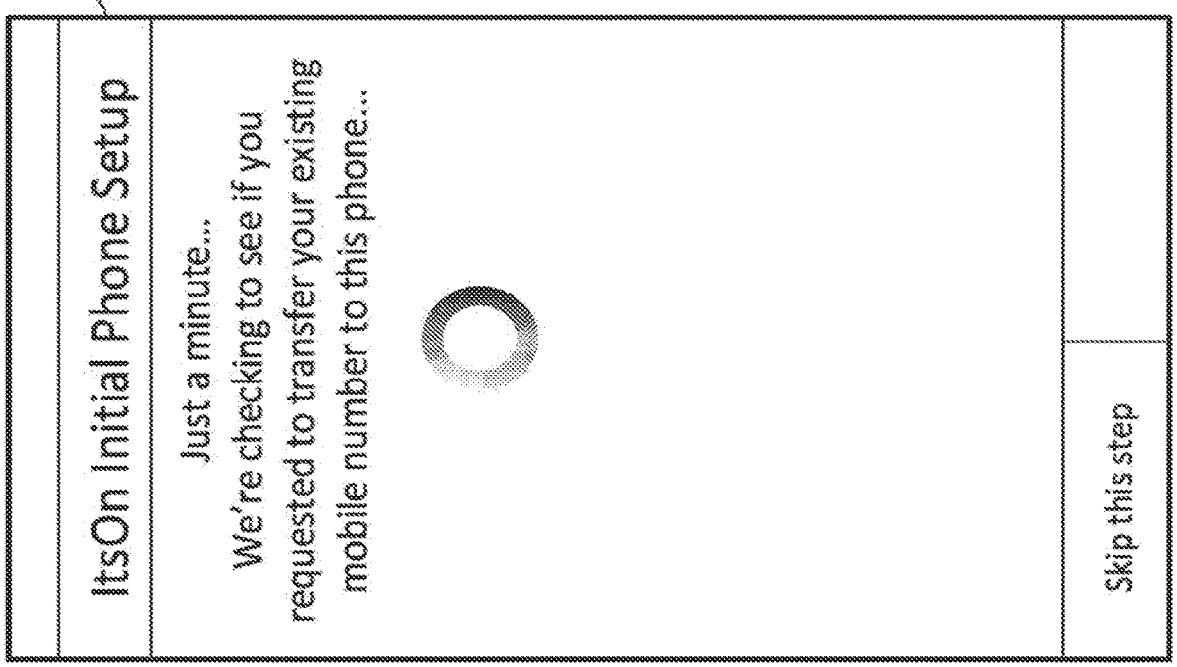
FIG. 13 illustrates an exemplary screen displaying a notification that the device is checking whether the user requested a transfer of the user's existing mobile number to the new device.
Figure 14:
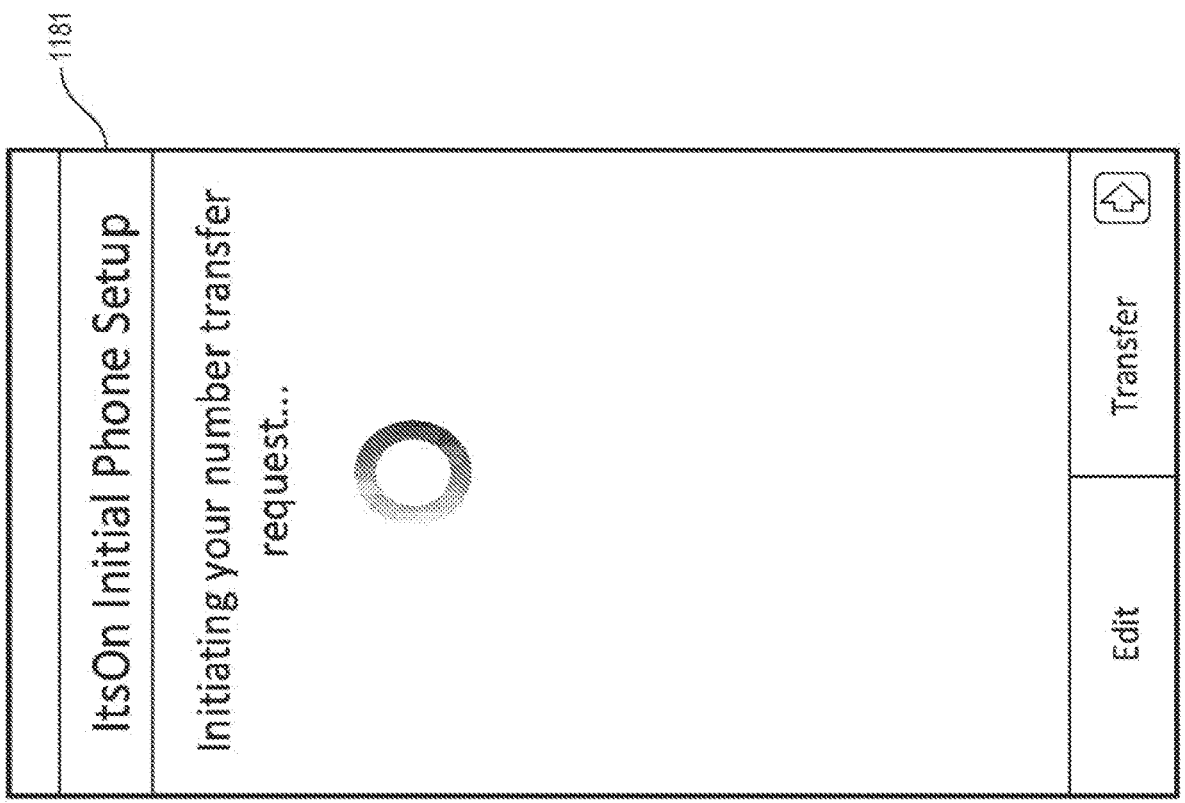
FIG. 14 illustrates an exemplary screen displaying a notification that the phone number transfer request has been initiated.

In some embodiments, a user orders a new device through a website associated with the new service provider. In some such embodiments, the user specifies when ordering the new device that the user wishes to port an existing phone number to the new device. Because the user does not want the number to be ported before the user has received the device, the new service provider pre-configures the new device with information that will allow the transfer of the existing number to the new device after the user receives the new device. When the user receives the new device and powers on the device, the device initiates the number transfer using information pre-configured by the new service provider. FIG. 13 illustrates a notification message 1180 that a user of the new device sees in accordance with a particular embodiment. As shown in FIG. 13, the one or more device agents assist in presenting a notification message 1180 that informs the user that the one or more device agents are checking to see whether the user requested a transfer of the user's existing mobile number to the new device. FIG. 14 illustrates a notification message 1181 that a user of the new device might see if the one or more device agents determine that the user requested a number transfer prior to receiving the new device. In the embodiment illustrated in FIG. 14, the notification message 1181 informs the user that the number transfer request is being initiated. In some embodiments in which the user requests a number transfer at the time of ordering a device, the one or more device agents perform one or more of the tasks described previously in the context of FIGS. 9-12.

Figure 15:
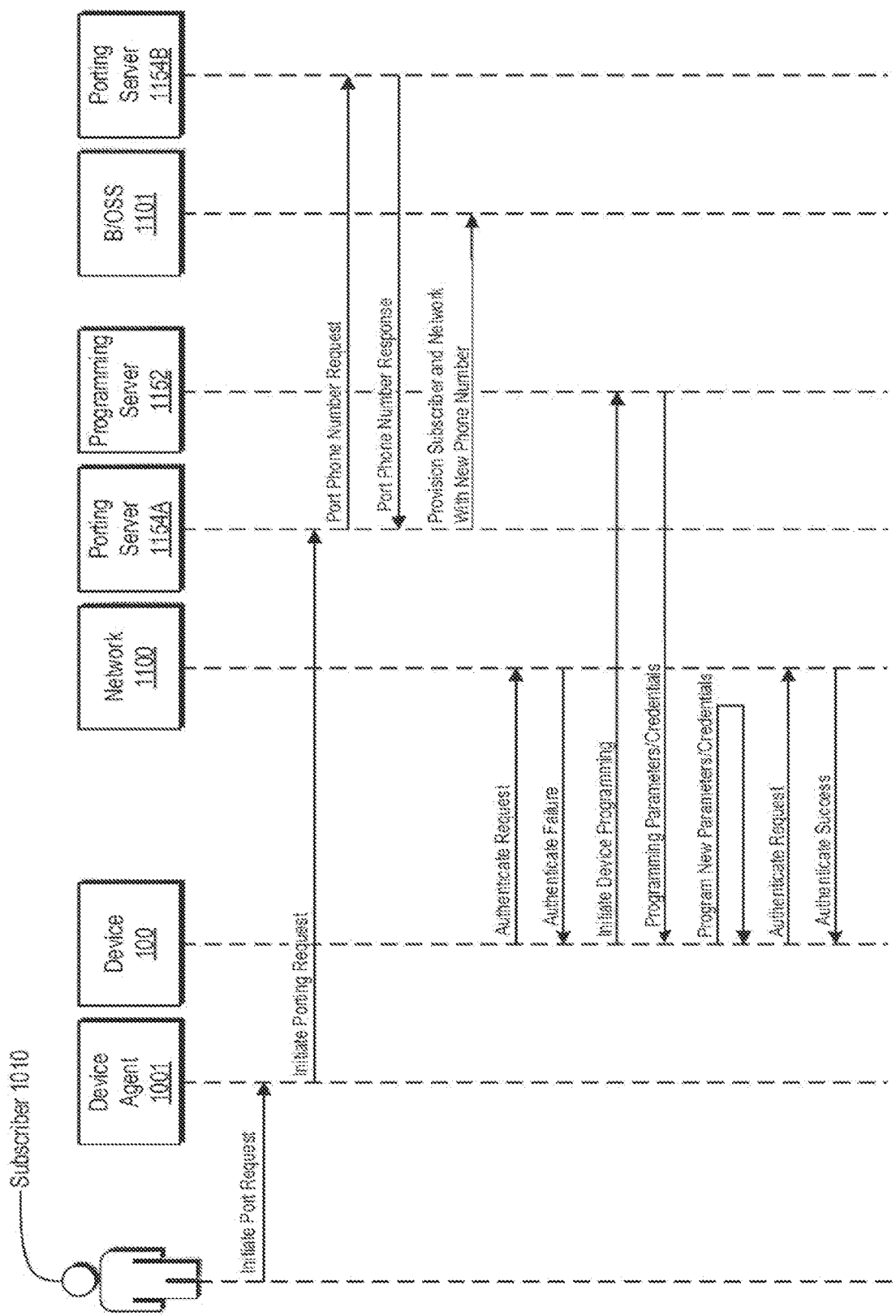
FIG. 15 is a transactional diagram illustrating a device-initiated number porting process with automatic reprogramming in accordance with some embodiments.

FIG. 15 illustrates a device-initiated number porting process with automatic reprogramming according to some embodiments. In FIG. 15, the subscriber 1010 desires to port his number from his or her prior service provider to a new service provider. The subscriber 1010 initiates a port request with assistance from one or more device agents (shown simply as "Device Agent" in FIG. 15). The one or more device agents assist in collecting the number porting information from the subscriber 1010. The one or more device agents can comprise one or more of an application program, an operating system (OS) component, an OS function, an OS service, a modem programming agent, a modem software or firmware agent, an over-the-air (OTA) mobile device parameter programing agent, an Open Mobile Alliance (OMA) agent, a secure communication agent configured to communicate number porting and number provisioning information, or another software or firmware agent.

Once the one or more device agents collect the porting information from the subscriber, the one or more agents communicate with porting server 1154A to communicate the porting request. Porting server 1154A is associated with the new service provider. Porting server 1154A can comprise one or more of a subscriber management system, a dedicated element to manage number porting, a clearinghouse porting server, a billing system, a provisioning system, or any other system that manages the number porting process for a service provider. Porting server 1154A communicates with porting server 1154B, which is associated with the subscriber's prior service provider, to request that the subscriber's telephone number be ported from the prior service provider to the new service provider. In some embodiments, porting server 1154A communicates directly with porting server 1154B. In some embodiments, porting server 1154A communicates with porting server 1154B via one or more intermediary servers or systems. In some embodiments, the one or more intermediary servers or systems are associated with a clearinghouse service to broker number porting requests between service providers.

Upon successful validation of the information associated with the subscriber's number porting request, porting server 1154B releases the association of the ported telephone number with the prior service provider and acknowledges the port phone number request to porting server 1154A. Once porting server 1154A receives the acknowledgement from porting server 1154B, porting server 1154A initiates a provisioning request to the current service provider's business/operational support systems (B/OSS) 1101. In some embodiments, provisioning of B/OSS 1101 includes provisioning programming server 1152 with the new device credentials and parameters. The new device credentials and parameters can comprise a phone number or mobile directory number (MDN), NAI, password, access point name (APN) configuration information (e.g., APN name, APN username, APN password, APN gateway, APN SMSC/MMSC, APN type, etc.), username, IP address, MAC address, International Mobile Subscriber Identity (IMSI), Encryption Key (Ki), Wi-Fi SSID, Wi-Fi network configuration (e.g., AP name, AP IP address, AP username. AP password, AP encryption type, AP security key, etc.), or a combination of these. In some embodiments, provisioning of B/OSS 1101 includes provisioning of the network elements (e.g., HLR, HSS, 2A Server, gateway servers, authentication servers and systems, access control systems) to associate the new device credentials with subscriber 1010.

When device 100, using its existing credentials, attempts to authenticate or be authorized by the new service provider's network system 1100 for services, network system 1100 (shown in FIG. 15 as "Network") denies the request. When the one or more device agents receive the authentication or authorization failure, the one or more device agents automatically initiate a programming session with programming server 1152. In some embodiments, the one or more device agents assist in presenting (e.g., displaying a message through a device display or screen, providing an audible message through a speaker, etc.) a notification to subscriber 1010 prior to initiating the device reprogramming process. In some embodiments, the one or more device agents assist in causing device 100 to be rebooted prior to initiating the programming session, or they assist in notifying a user to reboot device 100. In some embodiments, the one or more device agents assist in configuring device 100 with credentials to enable the programming session. During the programming session, the one or more device agents receive the updated device credentials or parameters, and the one or more agents update the device credentials or parameters with the credentials or parameters received from programming server 1152.

Upon completion of the programming session, device 100 can successfully authenticate with the new service provider's network system 1100 and be authorized for services. In some embodiments, upon completion of the programming session, the one or more device agents assist in rebooting device 100 to enable it to use the new credentials. In some embodiments, upon completion of the programming session, the one or more device agents assist in resetting the modem to enable device 100 to use the new credentials. In some embodiments, the one or more device agents assist in presenting (e.g., displaying a message through a device display or screen, providing an audible message through a speaker, etc.) a notification to subscriber 1010 to provide information related to the completion of the phone number port.

Exemplary Use Case 1: Number Porting Information is Pre-Stored on the Device Before the Number Porting Takes Place In some embodiments, a user wishes to port a phone number associated with a second device (the "second phone number") to a first device. In some such embodiments, one or more device agents on the first device accept the second phone number and possibly other associated information about an account associated with the second device. The one or more device agents relay this information to a network element. In some embodiments, the one or more device agents are then prepared for auto-reprogram to the second phone number by pre-storing on the first device at least a portion of the provisioning information needed to port the second phone number before the number port has taken place in the network-based subscriber management systems and/or over-the-air (OTA) programming systems. In some embodiments, the one or more device agents are configured to detect a port initiation condition that indicates the porting process should be initiated, and the one or more device agents utilize the pre-stored information to assist in implementing the number port. In some embodiments, the port initiation condition comprises a condition where a first phone number, assigned to the first device at the time the porting request is initiated, is no longer assigned to the first device. In some embodiments, determining that the first phone number is no longer assigned comprises determining that the device cannot access a mobile network with the credentials associated with the first phone number. In some embodiments, the port initiation condition comprises a signal from the one or more network elements. In some embodiments, the port initiation condition comprises determining that network access over a mobile network has been restricted or prevented.

In some embodiments, the one or more device agents accept the second phone number desired to be ported onto the device, communicate the information to a network element, and prepare for auto-reprogram to the second phone number but do not re-program the device immediately. In some such embodiments, the one or more device agents wait for a condition in which the first phone number is no longer valid and then automatically re-program the device and re-acquire the network.

Exemplary Use Case 2: Device Utilizes a Restricted Link Once the Number Porting has been Initiated In some embodiments, a user wishes to port a phone number associated with a second device (the "second phone number") to a first device. In some such embodiments, one or more device agents on the first device assist in the porting of the second phone number. In some embodiments, when the porting of the second phone number port is approved and the second phone number is released from the second service provider, the one or more device agents have access via a restricted mobile network access policy to a network server associated with the one or more device agents, and this network server assists in porting the second phone number to the first device. In some embodiments, the network server provides OTA programming of the second phone number and possibly other parameters (e.g., other credentials). In some embodiments, after providing OTA programming, the network server causes the device to authenticate or re-authenticate to the network system.

In some embodiments, a limited-access-permission ambient (i.e., non-user-paid) service through the wireless access network is provided to enable devices that do not have a valid phone number or other network access credential to communicate with a programming server. In some such embodiments, some or all devices that are not recognized by the network authentication system have access to a server that can re-provision a device's phone number, other network access credentials, or other network access configuration if a number port has been authorized and/or completed for the device.

In some embodiments, at some point in number porting process a subscriber management system associated with the first device provisions the network elements to reflect the second phone number and/or device access credentials, and at that point a policy allows the first device to have limited network access to communicate with the programming server, even if the first device has a partially invalid credential or set of credentials.

Exemplary Use Case 3: The Mobile Network Recognizes Two Numbers for the First Device, at Least for a Period of Time In some embodiments, a user wishes to port a phone number associated with a second device (the "second phone number") to a first device that, at the time the porting request is initiated, is associated with a first phone number. In some such embodiments, one or more device agents on the first device assist in the porting of the second phone number. In some embodiments, the network system is configured to allow the first device to access the network system with credentials associated with the first phone number and with credentials associated with the second phone number, at least for a period of time. In some such embodiments, when the number port is complete, and the first device accesses the network with credentials associated with the first phone number, the programming server or other network element signals to the first device (e.g., sends an SMS message to the one or more device agents, sends a data transport message to the one or more device agents, etc.) that the device requires reprogramming. In some embodiments, the one or more device agents initiate communications with the programming server to retrieve the new network access credentials (e.g., the credentials associated with the second phone number). In some embodiments, the new credentials are pre-stored on the first device, and the first device automatically reprograms itself without contacting the programming server.

In some embodiments, it is also desirable to update another configuration of the first device, including, for example, an application configuration. In some embodiments, there are certain applications that use device-related credentials to access a service where the service associates a device or user with a set of well-known credentials (e.g., a voice mail application). In some embodiments, when the phone number or other credential associated with the first device changes, the applications that use device credentials must communicate the device or subscriber credential change to the service. In some embodiments, a network element (e.g., provisioning server, programming server, subscriber management server, etc.) assists in updating the service with the new device credential. In some embodiments, the device application is required to log in, authenticate, or associate the user's service with the new credential. In some embodiments, the re-authentication, log in, or service association occurs automatically without user intervention. In some embodiments, prior to the re-authentication, log in, or service association with the new credential, the user is required to enter a valid PIN, password, or other credential to authorize the change to the service credentials. In some embodiments, the service credentials include access credentials. In some embodiments, the service credentials include account credentials or information (e.g., phone number for voice mail account, etc.)

In some embodiments, an already-resident or downloaded application exists on the user's current device. In some embodiments, the application assesses usage and determines if there is a better service offer (i.e., a service offer that would reduce costs to the user or that would otherwise benefit the user). In some embodiments, the better service offer is a service offer with the user's current service provider (i.e., the service provider associated with the user's current device). In some embodiments, the better service offer is with a different service provider. In some embodiments, the application provides information about the better service offer to the user through the device UI (e.g., by presenting information through a display, by providing an audible notification, etc.). In some embodiments, the application accepts a user indication that user wishes to accept the better service offer, and accepts billing information. In some embodiments, the application communicates that the user wishes to accept the service offer and billing information to a network element. In some embodiments, the network element is on the current service provider's network. In some embodiments, the network element is on the new service provider's network (i.e., the network operated by the service provider making the service offer that the user wishes to accept). In some embodiments, the network element is on a third-party network that is not owned by either the current service provider or the new service provider (e.g., the network element is on an independent agent/broker network). In some embodiments, the network element initiates the shipment of a new device (e.g., a new device providing the better service offer is sent or made available to the user). In some embodiments, when the user receives the new device, the user can either initiate number porting from an application that runs during initial device set up or via the one or more device agents on the new device.

In some embodiments, the user can enter the information to port a phone number through a website (either prior to activating service or once service is activated). In some embodiments, where the information is entered using a website, the one or more device agents are automatically triggered by a message communicated over the wireless network by a network element to initiate the number port (e.g., SMS message, USSD message, application push message (Google Cloud Messaging (GCM), Apple Push Notification Service (APNS), etc.)). In some embodiments, the one or more device agents assist in prompting the user to confirm the port request. In some embodiments, the port is initiated automatically in the background with no user intervention. In some embodiments, where the user enters the porting information through a website, the one or more device agents present the porting information through the device UI and at least assist in querying the user to verify and/or edit the porting information on the mobile device prior to initiating the port.

INCORPORATION BY REFERENCE

This document incorporates by reference for all purposes the following non-provisional U.S. patent applications:

application Ser. No. 12/380,780, filed Mar. 2, 2009, entitled AUTOMATED DEVICE PROVISIONING AND ACTIVATION, now U.S. Pat. No. 8,839,388 (issued Sep. 16, 2014); application Ser. No. 12/695,019, filed Jan. 27, 2010, entitled DEVICE ASSISTED CDR CREATION, AGGREGATION, MEDIATION AND BILLING, now U.S. Pat. No. 8,275,830 (issued Sep. 25, 2012); application Ser. No. 12/695,020, filed Jan. 27, 2010, entitled ADAPTIVE AMBIENT SERVICES, now U.S. Pat. No. 8,406,748 (issued Mar. 26, 2013); application Ser. No. 12/694,445, filed Jan. 27, 2010, entitled SECURITY TECHNIQUES FOR DEVICE ASSISTED SERVICES, now U.S. Pat. No. 8,391,834 (issued Mar. 5, 2013); application Ser. No. 12/694,451, filed Jan. 27, 2010, entitled DEVICE GROUP PARTITIONS AND SETTLEMENT PLATFORM, now U.S. Pat. No. 8,548,428 (issued Oct. 1, 2013); application Ser. No. 12/694,455, filed Jan. 27, 2010, entitled DEVICE ASSISTED SERVICES INSTALL, now U.S. Pat. No. 8,402,111 (issued Mar. 19, 2013); application Ser. No. 12/695,021, filed Jan. 27, 2010, entitled QUALITY OF SERVICE FOR DEVICE ASSISTED SERVICES, now U.S. Pat. No. 8,346,225 (issued Jan. 1, 2013); application Ser. No. 12/695,980, filed Jan. 28, 2010, entitled ENHANCED ROAMING SERVICES AND CONVERGED CARRIER NETWORKS WITH DEVICE ASSISTED SERVICES AND A PROXY, now U.S. Pat. No. 8,340,634 (issued Dec. 25, 2012); application Ser. No. 13/134,005, filed May 25, 2011, entitled SYSTEM AND METHOD FOR WIRELESS NETWORK OFFLOADING, now U.S. Pat. No. 8,635,335 (issued Jan. 21, 2014); application Ser. No. 13/134,028, filed May 25, 2011, entitled DEVICE-ASSISTED SERVICES FOR PROTECTING NETWORK CAPACITY, now U.S. Pat. No. 8,589,541 (issued Nov. 19, 2013); application Ser. No. 13/229,580, filed Sep. 9, 2011, entitled WIRELESS NETWORK SERVICE INTERFACES, now U.S. Pat. No. 8,626,115 (issued Jan. 7, 2014); application Ser. No. 13/237,827, filed Sep. 20, 2011, entitled ADAPTING NETWORK POLICIES BASED ON DEVICE SERVICE PROCESSOR CONFIGURATION, now U.S. Pat. No. 8,832,777 (issued Sep. 9, 2014); application Ser. No. 13/239,321, filed Sep. 21, 2011, entitled SERVICE OFFER SET PUBLISHING TO DEVICE AGENT WITH ON-DEVICE SERVICE SELECTION, now U.S. Pat. No. 8,898,293; application Ser. No. 13/248,028, filed Sep. 28, 2011, entitled ENTERPRISE ACCESS CONTROL AND ACCOUNTING ALLOCATION FOR ACCESS NETWORKS, now U.S. Pat. No. 8,924,469; application Ser. No. 13/247,998, filed Sep. 28, 2011, entitled COMMUNICATIONS DEVICE WITH SECURE DATA PATH PROCESSING AGENTS, now U.S. Pat. No. 8,725,123 (issued May 13, 2014); application Ser. No. 13/248,025, filed Sep. 28, 2011, entitled SERVICE DESIGN CENTER FOR DEVICE ASSISTED SERVICES, now U.S. Pat. No. 8,924,543; application Ser. No. 13/253,013, filed Oct. 4, 2011, entitled SYSTEM AND METHOD FOR PROVIDING USER NOTIFICATIONS, now U.S. Pat. No. 8,745,191 (issued Jun. 3, 2014); application Ser. No. 13/309,556, filed Dec. 1, 2011, entitled END USER DEVICE THAT SECURES AN ASSOCIATION OF APPLICATION TO SERVICE POLICY WITH AN APPLICATION CERTIFICATE CHECK, now U.S. Pat. No. 8,893,009; application Ser. No. 13/309,463, filed Dec. 1, 2011, entitled SECURITY, FRAUD DETECTION. AND FRAUD MITIGATION IN DEVICE-ASSISTED SERVICES SYSTEMS, now U.S. Pat. No. 8,793,758 (issued Jul. 29, 2014); application Ser. No. 13/374,959, filed Jan. 24, 2012, entitled FLOW TAGGING FOR SERVICE POLICY IMPLEMENTATION, now U.S. Pat. No. 8,606,911 (issued Dec. 10, 2013); application Ser. No. 13/441,821, filed Apr. 6, 2012, entitled MANAGING SERVICE USER DISCOVERY AND SERVICE LAUNCH OBJECT PLACEMENT ON A DEVICE; application Ser. No. 13/748,152, filed Jan. 23, 2013, entitled SERVICE PLAN DESIGN, USER INTERFACES, APPLICATION PROGRAMMING INTERFACES, AND DEVICE MANAGEMENT, now U.S. Pat. No. 9,557,889; application Ser. No. 13/802,483, filed Mar. 13, 2013, entitled MOBILE DEVICE ACTIVATION VIA DYNAMICALLY SELECTED ACCESS NETWORK; and application Ser. No. 13/842,172, filed Mar. 15, 2013, entitled NETWORK SERVICE PLAN DESIGN.

This document incorporates by reference for all purposes the following provisional patent applications: U.S. Provisional Application No. 61/206,354, filed Jan. 28, 2009, entitled SERVICES POLICY COMMUNICATION SYSTEM AND METHOD; U.S. Provisional Application No. 61/206,944, filed Feb. 4.2009, entitled SERVICES POLICY COMMUNICATION SYSTEM AND METHOD; U.S. Provisional Application No. 61/207,393, filed Feb. 10, 2009, entitled SERVICES POLICY COMMUNICATION SYSTEM AND METHOD; and U.S. Provisional Application No. 61/207,739, entitled SERVICES POLICY COMMUNICATION SYSTEM AND METHOD, filed Feb. 13, 2009; U.S. Provisional Application No. 61/270,353, filed on Jul. 6, 2009, entitled DEVICE ASSISTED CDR CREATION, AGGREGATION, MEDIATION AND BILLING; U.S. Provisional Application No. 61/275,208, filed Aug. 25, 2009, entitled ADAPTIVE AMBIENT SERVICES; and U.S. Provisional Application No. 61/237,753, filed Aug. 28, 2009, entitled ADAPTIVE AMBIENT SERVICES; U.S. Provisional Application No. 61/252,151, filed Oct. 15, 2009, entitled SECURITY TECHNIQUES FOR DEVICE ASSISTED SERVICES; U.S. Provisional Application No. 61/252,153, filed Oct. 15, 2009, entitled DEVICE GROUP PARTITIONS AND SETTLEMENT PLATFORM: U.S. Provisional Application No. 61/264,120, filed Nov. 24, 2009, entitled DEVICE ASSISTED SERVICES INSTALL; U.S. Provisional Application No. 61/264,126, filed Nov. 24, 2009, entitled DEVICE ASSISTED SERVICES ACTIVITY MAP; U.S. Provisional Application No. 61/348,022, filed May 25, 2010, entitled DEVICE ASSISTED SERVICES FOR PROTECTING NETWORK CAPACITY; U.S. Provisional Application No. 61/381,159, filed Sep. 9, 2010, entitled DEVICE ASSISTED SERVICES FOR PROTECTING NETWORK CAPACITY: U.S. Provisional Application No. 61/381,162, filed Sep. 9, 2010, entitled SERVICE CONTROLLER INTERFACES AND WORKFLOWS; U.S. Provisional Application No. 61/384,456, filed Sep. 20, 2010, entitled SECURING SERVICE PROCESSOR WITH SPONSORED SIMS; U.S. Provisional Application No. 61/389,547, filed Oct. 4, 2010, entitled USER NOTIFICATIONS FOR DEVICE ASSISTED SERVICES; U.S. Provisional Application No. 61/385,020, filed Sep. 21, 2010, entitled SERVICE USAGE RECONCILIATION SYSTEM OVERVIEW; U.S. Provisional Application No. 61/387,243, filed Sep. 28, 2010, entitled ENTERPRISE AND CONSUMER BILLING ALLOCATION FOR WIRELESS COMMUNICATION DEVICE SERVICE USAGE ACTIVITIES; U.S. Provisional Application No. 61/387,247, filed Sepbember 28, entitled SECURED DEVICE DATA RECORDS, 2010; U.S. Provisional Application No. 61/407,358, filed Oct. 27, 2010, entitled SERVICE CONTROLLER AND SERVICE PROCESSOR ARCHITECTURE; U.S. Provisional Application No. 61/418,507, filed Dec. 1, 2010, entitled APPLICATION SERVICE PROVIDER INTERFACE SYSTEM; U.S. Provisional Application No. 61/418,509, filed Dec. 1, 2010, entitled SERVICE USAGE REPORTING RECONCILIATION AND FRAUD DETECTION FOR DEVICE ASSISTED SERVICES; U.S. Provisional Application No. 61/420,727, filed Dec. 7, 2010, entitled SECURE DEVICE DATA RECORDS; U.S. Provisional Application No. 61/422,565, filed Dec. 13, 2010, entitled SERVICE DESIGN CENTER FOR DEVICE ASSISTED SERVICES; U.S. Provisional Application No. 61/422,572, filed Dec. 13, 2010, entitled SYSTEM INTERFACES AND WORKFLOWS FOR DEVICE ASSISTED SERVICES; U.S. Provisional Application No. 61/422,574, filed Dec. 13, 2010, entitled SECURITY AND FRAUD DETECTION FOR DEVICE ASSISTED SERVICES; U.S. Provisional Application No. 61/435,564, filed Jan. 24, 2011, entitled FRAMEWORK FOR DEVICE ASSISTED SERVICES; U.S. Provisional Application No. 61/472,606, filed Apr. 6, 2011, entitled MANAGING SERVICE USER DISCOVERY AND SERVICE LAUNCH OBJECT PLACEMENT ON A DEVICE; U.S. Provisional Application No. 61/550,906, filed Oct. 24, 2011, entitled SECURITY FOR DEVICE-ASSISTED SERVICES; U.S. Provisional Application No. 61/589,830, filed Jan. 23, 2012, entitled METHODS AND APPARATUS TO PRESENT INFORMATION ABOUT VOICE, MESSAGING, AND DATA SERVICES ON WIRELESS MOBILE DEVICES; U.S. Provisional Application No. 61/610,876, filed Mar. 14, 2012, entitled METHODS AND APPARATUS FOR APPLICATION PROMOTION AND SPONSORSHIP; U.S. Provisional Application No. 61/610,910, filed Mar. 14, 2012, entitled WIFI ACTIVATION BACKUP PROCESS; U.S. Provisional Application No. 61/658,339, filed Jun. 11, 2012, entitled MULTI-DEVICE MASTER SERVICES ACCOUNTS, SERVICE PLAN SHARING AND ASSIGNMENTS, AND DEVICE MANAGEMENT FROM A MASTER DEVICE; U.S. Provisional Application No. 61/667,927, filed Jul. 3, 2012, entitled FLEXIBLE MULTI-DEVICE MASTER SERVICE ACCOUNTS, SERVICE PLAN SHARING AND ASSIGNMENTS, AND DEVICE MANAGEMENT; U.S. Provisional Application No. 61/674,331, filed Jul. 21, 2012, entitled SERVICE CONTROLLER FOR MANAGING CLOUD-BASED POLICY; U.S. Provisional Application No. 61/724,267, filed Nov. 8, 2012, entitled FLEXIBLE SERVICE PLAN DESIGN, USER INTERFACE AND DEVICE MANAGEMENT; U.S. Provisional Application No. 61/724,837, filed Nov. 9, 2012, entitled SERVICE PLAN DISCOVERY, CUSTOMIZATION. AND MANAGEMENT; U.S. Provisional Application No. 61/724,974, filed Nov. 10, 2012, entitled SERVICE PLAN DISCOVERY, CUSTOMIZATION, AND MANAGEMENT; U.S. Provisional Application No. 61/732,249, filed Nov. 30, 2012, entitled APPLICATION PROGRAMMING INTERFACES FOR SMART SERVICES; U.S. Provisional Application No. 61/734,288, filed Dec. 6, 2012, entitled INTERMEDIATE NETWORKING DEVICE SERVICES; and U.S. Provisional Application No. 61/745,548, filed Dec. 22, 2012, entitled SERVICE PLAN DESIGN, USER INTERFACES, APPLICATION PROGRAMMING INTERFACES, AND DEVICE MANAGEMENT; U.S. Provisional Application No. 61/756,332, filed Jan. 24, 2013, entitled MOBILE HOTSPOT; U.S. Provisional Application No. 61/758,964, filed Jan. 30, 2013, entitled MOBILE HOTSPOT; U.S. Provisional Application No. 61/765,978, filed Feb. 18, 2013, entitled ENHANCED CURFEW AND PROTECTION ASSOCIATED WITH A DEVICE GROUP; U.S. Provisional Application No. 61/794,116, filed Mar. 15, 2013, entitled ENHANCED INTERMEDIATE NETWORKING DEVICE: U.S. Provisional Application No. 61/792,765, filed Mar. 15, 2013, entitled DEVICE GROUP AND SERVICE PLAN MANAGEMENT; U.S. Provisional Application No. 61/793,894, filed Mar. 15, 2013, entitled SIMPLIFIED POLICY DESIGN, MANAGEMENT, AND IMPLEMENTATION; U.S. Provisional Application No. 61/799,710, filed Mar. 15, 2013, entitled AMBIENT OR SPONSORED SERVICES; and U.S. Provisional Application No. 61/801,074, filed Mar. 15, 2013, entitled DEVICE GROUP AND SERVICE PLAN MANAGEMENT.

The invention claimed is:

1. A method for use by a network system, the method comprising:
granting, to a wireless device presenting a first credential, access to a plurality of first services on a cellular network;
receiving, from the wireless device, a request to replace the first credential of the wireless device with a target credential;
after receiving the request, restricting, the wireless device presenting the first credential, access to one or more of the plurality of services on the cellular network, while allowing the wireless device to communicate via the cellular network with a programming server of the network system;
obtaining an updated credential from a database, the updated credential associated with the wireless device;
provisioning one or more network elements in accordance with the updated credential;
sending the updated credential to the wireless device for use by the wireless device; and
based on the wireless device presenting the updated credential to the cellular network, allowing the wireless device to access the one or more the plurality of services on the cellular network.

2. The method of claim 1, wherein the first credential, the target credential, and the updated credential are phone numbers.

3. The method of claim 2, wherein the target credential and the updated credential are a same phone number.

4. The method of claim 3, wherein the target credential includes at least one of an international mobile subscriber identifier (IMSI), a mobile station identifier (MSID), a mobile station international ISDN number (MSISDN), a subscriber information module (SIM) identifier, an electronic serial number (ESN), a mobile equipment identifier (MEID), an international mobile equipment identity (IMEI), a device identifier, a subscriber identifier, a service account identifier, a media access control (MAC) address, an Internet protocol (IP) address, a token, a one-time token, a mobile directory number (MDN), a network access identifier (NAI), a user name, a password, access point name (APN) configuration information, an encryption key (Ki), a Wi-Fi service set identifier (SSID), or a Wi-Fi network configuration.

5. The method of claim 1, wherein allowing the wireless device to communicate via the cellular network with the programming server of the network system comprises allowing the wireless device to communicate via the cellular network with the programming server of the network system when the wireless device presents the first credential to the cellular network.

6. The method of claim 1, wherein allowing the wireless device to communicate via the cellular network with the programming server of the network system comprises allowing the wireless device to communicate via the cellular network with the programming server of the network system when the wireless device presents bootstrap credentials to the cellular network.

7. The method of claim 1, further comprising:
based on the wireless device presenting the updated credential to the cellular network, allowing the wireless device to access additional one or more the plurality of services on the cellular network, wherein additional one or more the plurality of services were not accessible to the wireless device when presenting the first credential to the cellular network.

8. The method of claim 1, wherein the restricted access comprises restricted access to registration on the cellular network.

9. The method of claim 1, wherein the restricted access comprises restricted access to voice calls or text messaging.

10. The method of claim 1, wherein the restricted access comprises restricted access to authorization for a service.

11. A network system comprising:
a processor configured to:
grant, to a wireless device presenting a first credential, access to a plurality of first services on a cellular network;
receive, from the wireless device, a request to replace the first credential of the wireless device with a target credential;
after receiving the request, restrict, the wireless device presenting the first credential, access to one or more of the plurality of services on the cellular network, while allowing the wireless device to communicate via the cellular network with a programming server of the network system;
obtain an updated credential from a database, the updated credential associated with the wireless device;
provision one or more network elements in accordance with the updated credential;
send the updated credential to the wireless device for use by the wireless device; and
based on the wireless device presenting the updated credential to the cellular network, allow the wireless device to access the one or more the plurality of services on the cellular network.

12. The network system of claim 11, wherein the first credential, the target credential, and the updated credential are phone numbers.

13. The network system of claim 12, wherein the target credential and the updated credential are a same phone number.

14. The network system of claim 13, wherein the target credential includes at least one of an international mobile subscriber identifier (IMSI), a mobile station identifier (MSID), a mobile station international ISDN number (MSISDN), a subscriber information module (SIM) identifier, an electronic serial number (ESN), a mobile equipment identifier (MEID), an international mobile equipment identity (IMEI), a device identifier, a subscriber identifier, a service account identifier, a media access control (MAC) address, an Internet protocol (IP) address, a token, a one-time token, a mobile directory number (MDN), a network access identifier (NAI), a user name, a password, access point name (APN) configuration information, an encryption key (Ki), a Wi-Fi service set identifier (SSID), or a Wi-Fi network configuration.

15. The network system of claim 11, wherein allowing the wireless device to communicate via the cellular network with the programming server of the network system comprises allowing the wireless device to communicate via the cellular network with the programming server of the network system when the wireless device presents the first credential to the cellular network.

16. The network system of claim 11, wherein allowing the wireless device to communicate via the cellular network with the programming server of the network system comprises allowing the wireless device to communicate via the cellular network with the programming server of the network system when the wireless device presents bootstrap credentials to the cellular network.

17. The network system of claim 11, wherein the processor is further configured to:
based on the wireless device presenting the updated credential to the cellular network, allow the wireless device to access additional one or more the plurality of services on the cellular network, wherein additional one or more the plurality of services were not accessible to the wireless device when presenting the first credential to the cellular network.

18. The network system of claim 11, wherein the restricted access comprises restricted access to registration on the cellular network.

19. The network system of claim 11, wherein the restricted access comprises restricted access to voice calls or text messaging.

20. The network system of claim 11, wherein the restricted access comprises restricted access to authorization for a service.

* * * * *